(12) United States Patent
Fitzgibbon et al.

(10) Patent No.: US 8,836,469 B2
(45) Date of Patent: Sep. 16, 2014

(54) METHOD AND APPARATUS TO ACCOMMODATE BOTH A LEARN MODE OF OPERATION AND A PAIRING MODE OF OPERATION DURING A RELATIONSHIP-ESTABLISHMENT MODE OF OPERATION

(75) Inventors: James J. Fitzgibbon, Batavia, IL (US); Jeremy Eugene Jenkins, Bartlett, IL (US); Robert R. Keller, Jr., Park Ridge, IL (US); Edward James Lukas, Batavia, IL (US); Dilip Jagjivan Patel, Bartlett, IL (US); John Steven Scaletta, Algonquin, IL (US); Greg John Stanek, Aurora, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 721 days.

(21) Appl. No.: 12/905,604

(22) Filed: Oct. 15, 2010

(65) Prior Publication Data

US 2012/0092124 A1    Apr. 19, 2012

(51) Int. Cl.
G05B 19/00    (2006.01)
H04B 1/713    (2011.01)
E05F 15/20    (2006.01)

(52) U.S. Cl.
CPC ............. *H04B 1/713* (2013.01); *E05F 15/2076* (2013.01); *E05Y 2900/106* (2013.01); *G08C 2201/20* (2013.01)
USPC ........................................................ 340/5.1

(58) Field of Classification Search
USPC .......................... 340/5.1, 3.1, 12.22; 455/41.2
See application file for complete search history.

(56) References Cited

U.S. PATENT DOCUMENTS

| 3,988,676 | A   |   | 10/1976 | Whang |
| 5,872,513 | A   |   | 2/1999  | Fitzgibbon et al. |
| 5,880,721 | A   |   | 3/1999  | Yen |
| 6,091,343 | A   | * | 7/2000  | Dykema et al. ............ 340/13.21 |
| 6,310,548 | B1  |   | 10/2001 | Stephens, Jr. |
| 6,346,889 | B1  |   | 2/2002  | Moss |
| 6,388,559 | B1  |   | 5/2002  | Cohen |
| 6,424,056 | B1  |   | 7/2002  | Irvin |
| 6,738,602 | B1  | * | 5/2004  | Heinen et al. ................... 455/76 |
| 6,903,650 | B2  |   | 6/2005  | Murray |

(Continued)

OTHER PUBLICATIONS

Bluetooth standard, Jul. 26, 2007, pp. 534-536.*

(Continued)

*Primary Examiner* — Vernal Brown
(74) *Attorney, Agent, or Firm* — Fitch Even Tabin & Flannery LLP

(57) ABSTRACT

A control circuit initiates a relationship-establishment mode of operation and operates in both a learn mode of operation and a pairing mode of operation. When the control circuit completes one of these modes of operation (for example, the learn mode of operation, the pairing mode of operation, or either) the relationship-establishment mode of operation can switch to only using the remaining mode of operation during a remainder of the relationship-establishment mode of operation. One can also disable a previously-established relationship for each of a first category of remote platforms (such as remote platforms that became authorized through a learn mode of operation) when the user presses a button. Upon then detecting a second end-user assertion of the end-user interface, the control circuit can further disable a previously-established relationship with each of a second category of remote platforms (such as remote platforms that became authorized through a pairing mode of operation).

78 Claims, 9 Drawing Sheets

(56) References Cited

U.S. PATENT DOCUMENTS

| | | | |
|---|---|---|---|
| 6,907,029 B2 | 6/2005 | Brabrand | |
| 7,221,256 B2 * | 5/2007 | Skekloff et al. | 340/5.61 |
| 7,266,344 B2 | 9/2007 | Rodriguez | |
| 7,375,484 B2 | 5/2008 | Murray | |
| 7,506,057 B2 * | 3/2009 | Bigioi et al. | 709/227 |
| 7,602,835 B1 * | 10/2009 | Kingston et al. | 375/142 |
| 7,708,048 B2 | 5/2010 | Mays | |
| 7,733,213 B2 * | 6/2010 | Levine | 340/5.28 |
| 8,380,359 B2 * | 2/2013 | Duchene et al. | 700/295 |
| 2002/0163905 A1 | 11/2002 | Brabrand | |
| 2003/0214385 A1 * | 11/2003 | Murray | 340/5.23 |
| 2004/0085185 A1 | 5/2004 | Waggamon | |
| 2005/0272372 A1 | 12/2005 | Rodriguez | |
| 2006/0158344 A1 | 7/2006 | Bambini | |
| 2008/0309535 A1 | 12/2008 | Le Guillou | |
| 2010/0056055 A1 * | 3/2010 | Ketari | 455/41.3 |
| 2010/0141381 A1 * | 6/2010 | Bliding et al. | 340/5.61 |
| 2012/0092125 A1 | 4/2012 | Farber et al. | |
| 2012/0094604 A1 | 4/2012 | Amin et al. | |

OTHER PUBLICATIONS

"Home Control Solution" Owner's Manual; Wayne Dalton Part No. 333394, Jul. 20, 2007 (cover through p. 18).

"Prodrive Garage Door Opener Installation Instructions and Owner's Manual," Wayne Dalton Part No. 325809, Jul. 16, 2008 (cover to cover) (pertaining to a Z-wave capable garage door opener of the type referred to in the "Home Control Solution" Owner's Manual Submitted herewith).

* cited by examiner

METHOD AND APPARATUS TO ACCOMMODATE BOTH A LEARN MODE OF OPERATION AND A PAIRING MODE OF OPERATION DURING A RELATIONSHIP-ESTABLISHMENT MODE OF OPERATION

TECHNICAL FIELD

This invention relates generally to wireless data communications.

BACKGROUND

Wireless data communications comprises a well-developed area of prior art endeavor. This includes, for example, the transmission of remote-control signals/messages from a one-way wireless transmitter to a compatible wireless receiver as comprises a part of a movable barrier operator (such as, but not limited to, a garage door opener). For the most part such transmissions often make use of unlicensed spectrum in the ultra-high frequency (UHF) range.

Such approaches have served well for many years. There are application settings, however, where further capabilities in these regards would be useful. Two-way data communications in such an application setting, for example, has been proposed. The specifics, however, of suitably configuring a useful system to accommodate such a direction present numerous challenges. These challenges, in turn, have no doubt contributed to a delayed introduction of useful practices in these regards.

As but one example in these regards, relationship-establishment techniques are typically different when comparing one-way methodologies with two-way approaches. This, in turn, can lead to conflicts and/or compromises with respect to system design and configuration.

BRIEF DESCRIPTION OF THE DRAWINGS

The above needs are at least partially met through provision of the method and apparatus to accommodate both a learn mode of operation and a pairing mode of operation during a relationship-establishment mode of operation described in the following detailed description, particularly when studied in conjunction with the drawings, wherein.

Figure 1:
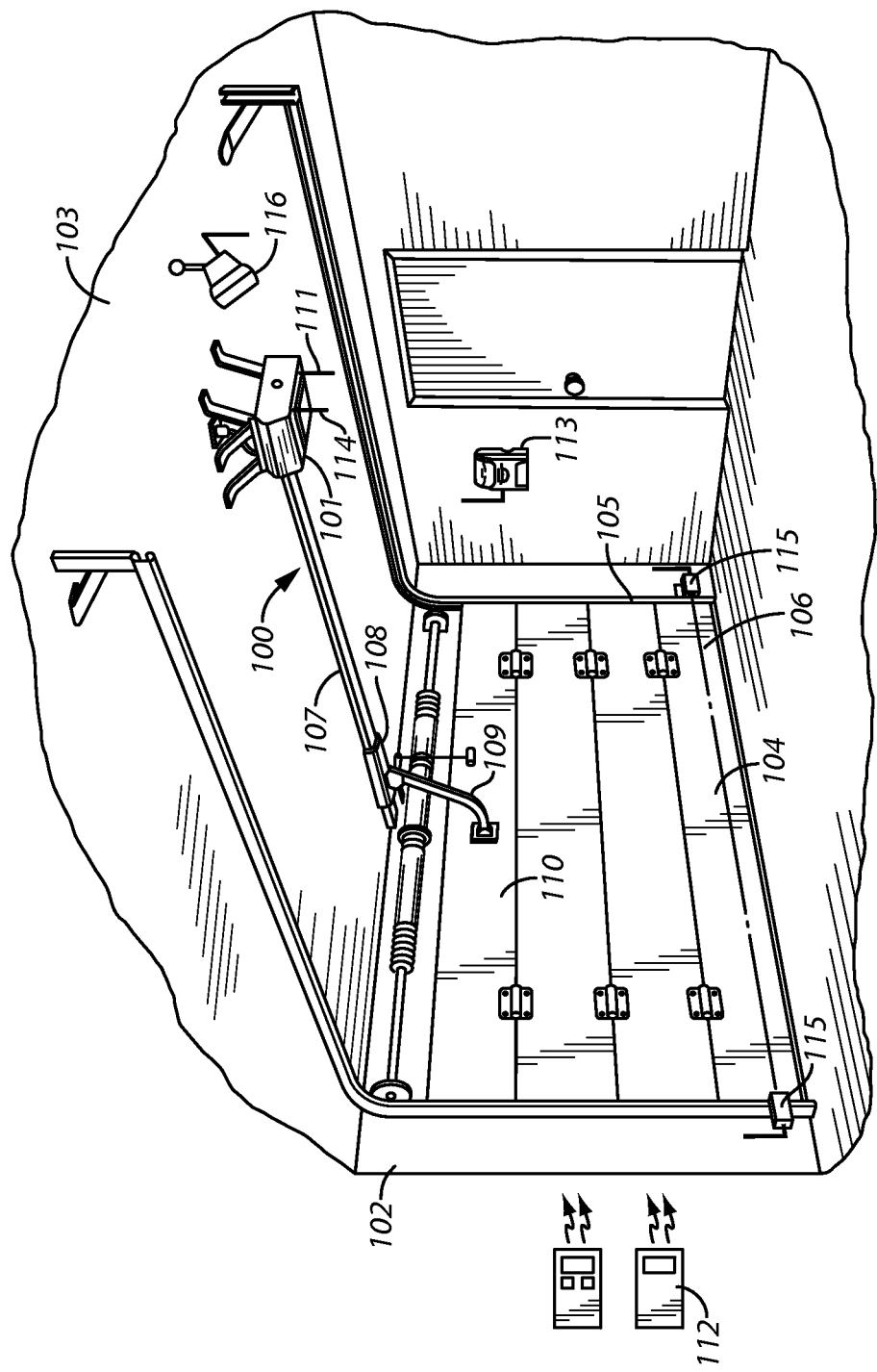
FIG. 1 comprises a perspective view as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit can initiate a relationship-establishment mode of operation. During this relationship-establishment mode of operation the control circuit operates in both a learn mode of operation and a pairing mode of operation. This can be particularly useful when, for example, the control circuit comprises a part of a movable-barrier operator. By one approach, this relationship-establishment mode of operation is initiated through detection of when an end user asserts a button. Accordingly, both a learn mode of operation and a pairing mode of operation can be initiated through a single push of a button. If desired, this can comprise having both the pairing mode of operation and the learn mode of operation automatically sequentially performed so that it appears to an end user as though both activities occur at essentially the same time.

These teachings are flexible in practice and can be applied in a variety of ways. For example, by one approach, during an initial period of time this approach will accommodate monitoring for both a learn mode transmission and a pairing mode transmission. At the conclusion of this first period of time the control circuit can then, for a second period of time, monitor for a learn mode of transmission while now transmitting its own pairing mode transmission. Finally, at the conclusion of this second period of time and for a third period of time the control circuit can conclude its own learn mode efforts and engage exclusively in pairing mode behavior.

As another example in these regards, when the control circuit completes one of these modes of operation (for example, the learn mode of operation, the pairing mode of operation, or either) the relationship-establishment mode of operation can switch to only using the remaining mode of operation during a remainder of the relationship-establishment mode of operation.

These teachings will also accommodate disabling a previously-established relationship (this can comprise, for example, detecting an end-user assertion of an end-user interface) and responsively disabling a previously-established authorization relationship with each of a first category of remote platforms (such as remote platforms that became authorized through a learn mode of operation). Upon then detecting a second end-user assertion of the end-user interface, the control circuit can then disable a previously-established relationship with each of a second category of remote platforms (such as remote platforms that became authorized through a pairing mode of operation).

And as yet another example in these regards, the control circuit can be configured to maintain, on a non-temporary basis, previously-established authorized wireless relationships for each of a first category of remote platforms (such as platforms intended for ongoing and regular use in conjunction with the control circuit). The control circuit can also maintain, but only on a temporary basis, at least a portion of the previously-established authorized wireless relationships for each of a second category of remote platforms (such as service tools where only a short period of authorization is typically needed or appropriate).

These and other benefits may become clearer upon making a thorough review and study of the following detailed description. Referring now to the drawings, and in particular to FIG. 1, it may be helpful to first describe an illustrative application setting. It will be understood that the specific of this example are intended to serve only in an illustrative regard and are not intended to express or suggest any corresponding limitations with respect to the scope of these teachings.

In this illustrative example, a barrier movement controller 100 comprises, in part, a movable barrier operator 101 positioned within a garage 102. This movable barrier operator 101 mounts to the garage ceiling 103 and serves to control and effect selective movement of a selectively movable barrier comprising, in this illustrative example, a multi-panel garage door 104. The multi-panel garage door 104 includes a plurality of rollers (not shown) rotatably confined within a pair of tracks 105 positioned adjacent to and on opposite sides of the garage opening 106.

The movable barrier operator 101 includes a head unit having a motive component such as an electric motor (not shown) to provide motion to the garage door 104 via a rail assembly 107. The rail assembly 107 in this example includes a trolley 108 for releasable connection of the head unit to the garage door 104 via an arm 109. The arm 109 connects to an upper portion 110 of the garage door 104. The trolley 108 effects the desired movement of the door 104 via the arm 109 via a transmission that can be an endless chain, belt, or screw drive, all of which are well know in the industry. As an alternative another head unit that is well known in the industry is a jackshaft operator that moves the barrier by affecting a counter balance system.

The head unit includes a radio frequency receiver (not shown) having an antenna 111 to facilitate receiving coded radio frequency transmissions from one or more radio transmitters 112. These transmitters 112 may include portable transmitters (such as keyfob-style transmitters) or keypad transmitters (such as those often installed in automobile sun visors). The radio receiver typically connects to a processor (not shown) in the head unit that interprets received signals and responsively controls other portions of the movable barrier operator 101.

The head unit also includes a radio frequency transmitter (not shown) having an antenna 114 to facilitate transmitting coded radio frequency transmissions to one or more two-way remote platforms as described herein. In many application settings the radio frequency receiver and the radio frequency transmitter will operate using non-overlapping and considerably different bands. Together, this receiver and transmitter comprise a transceiver.

An end-user interface 113 such as a push button-based wall control unit can comprise one of the aforementioned two-way remote platforms and can wirelessly communicate with the head unit to effect control of a movable barrier operator motor and other components. So configured, for example, an end user can assert the end-user interface 113 to signal to the movable barrier operator 101 that the barrier 104 should now be moved from an opened position to a closed position.

An obstacle detector 115 can also comprise one of the aforementioned two-way remote platforms and can also wirelessly communicate with the head unit. The obstacle detector can employ, for example, optical (such as infrared-pulsed beams) approaches to detect when the garage door opening 106 is blocked. The obstacle detector 115 can then wirelessly signal the movable barrier operator 101 regarding the blockage. The latter can then, for example, cause a reversal or opening of the door 104 to avoid contacting the obstacle.

A light fixture 116 can also comprise one of the aforementioned two-way remote platforms and hence can also wirelessly communicate with (or via) the head unit. So configured, the movable barrier operator 101 can selectively cause the light fixture 116 to provide a source of light if and as appropriate.

Figure 2:
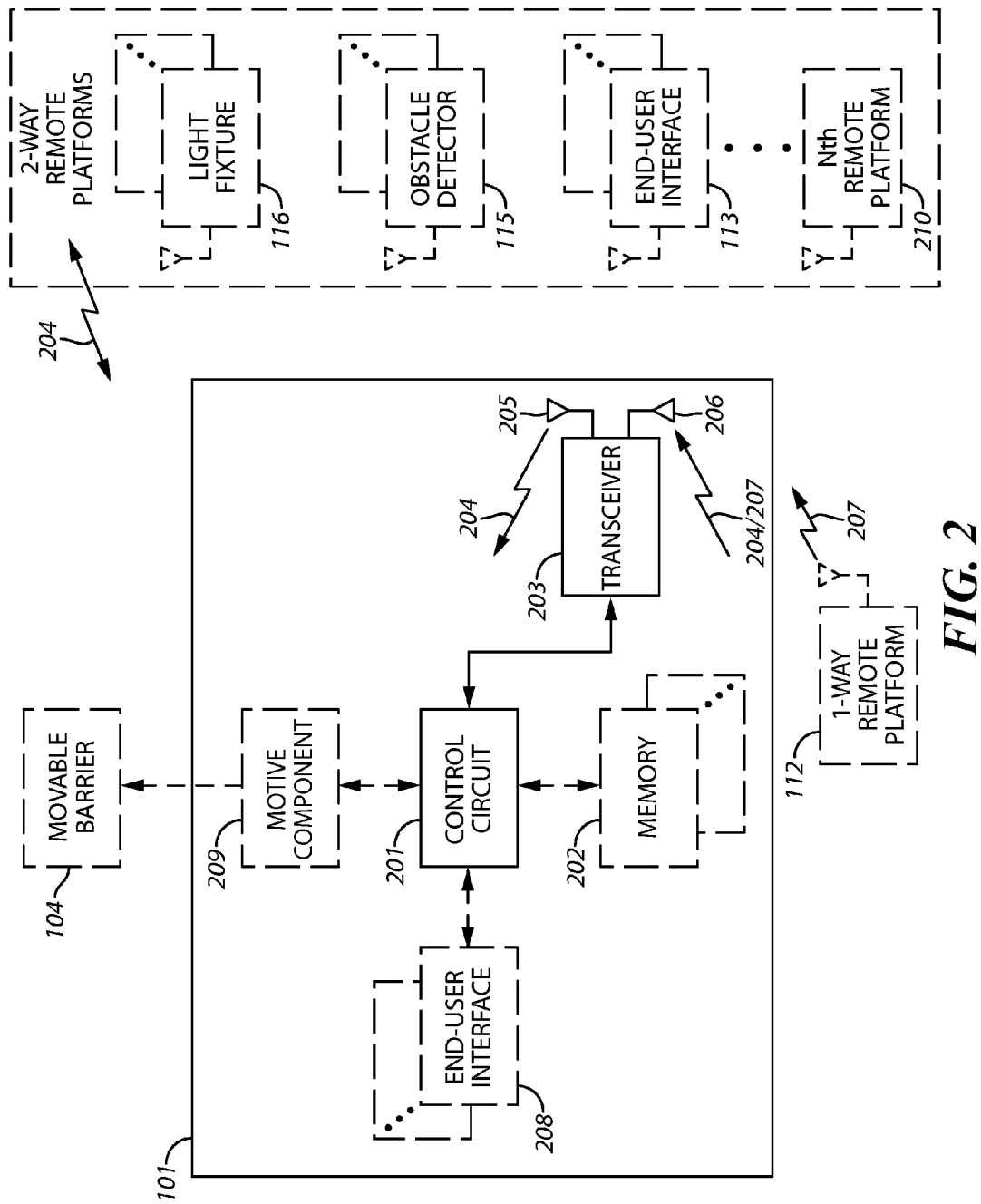
FIG. 2 comprises a block diagram as configured in accordance with various embodiments of the invention.

FIG. 2 provides further specific examples with respect to the movable barrier operator 101. Again, these points of specificity are not to be taken as suggesting any particular limitations in these regards and are offered instead for the sake of illustration.

In this illustrative example the movable barrier operator 101 comprises a control circuit 201 of choice. Such a control circuit 201 can comprise a fixed-purpose hard-wired platform or can comprise a partially or wholly programmable platform. All of these architectural options are well known and understood in the art and require no further description here. This control circuit 201 can be configured to carry out one or more of the steps, actions, or functions described herein as desired.

By one approach, when the control circuit 201 comprises a partially or wholly-programmable platform this can comprise programming the control circuit 201 in this manner. In such a case the computer instructions comprising this programming can be stored within the control circuit 201 itself and/or can be partially or wholly stored in one or more memory components 202. Such an approach is well understood in the art and hence will not be further elaborated upon here.

This control circuit 201 operably couples to a transceiver 203. This transceiver 203 can comprise, for example, a wireless transceiver. This transceiver 203 can comprise both a wireless radio-frequency transmitter that is configured to transmit in a first discrete band 204 as well as a wireless radio-frequency receiver. (As used herein, the expression "band" will be understood to refer to a range of allocated or otherwise defined radio-frequency communications spectrum that is bounded by a lower frequency and a higher frequency and that includes all of the intervening frequencies.) By one approach this first discrete band 204 can comprise an industrial, scientific, and medical (ISM) band as allocated by the United States Federal Communications Commission at around 900 MHz for unlicensed use in support of such activities. (Those skilled in the art will know that other regulatory entities around the world have allocated spectrum for like usage at various frequencies and these allocations, too, can be considered ISM bands.)

By one approach the aforementioned wireless radio-frequency receiver can be configured to receive in both of at least two discrete bands. This can comprise, for example, the aforementioned ISM band in the 900 MHz-range ISM band as well as another discrete band 207 that comprises a lower-frequency band such as an ultra-high frequency (UHF) band. Such an approach will serve well in a variety of application settings. That said, these teachings are not limited in these regards. Accordingly, either or both of these bands can comprise, for example, a very-high frequency (VHF) band, a global system for mobile communications-railway (GSMR) band, or the aforementioned UHF or ISM bands to note but a few examples in these regards.

In this illustrative example this transceiver 203 has two antennas 205 and 206 (which may comprise, for example, whip antennas as are known in the art). The first antenna 205 is used by the aforementioned transmitter and is tuned to that first discrete band 204. (As used herein, the expression "tuned to" will be understood to refer to a configuration and choice of materials and components that are particularly selected and suitable to optimize transmission at the frequencies comprising that first discrete band 204.) The second antenna 206 operably couples to the aforementioned receiver. Accordingly, the transceiver 203 uses this reception antenna 206 to receive both transmissions within that first discrete band 204 as well as within the second discrete band 207. By one approach, and notwithstanding this dual-usage approach, this second antenna 206 is tuned to the second discrete band 207.

As noted above, these antennas can be tuned to optimize performance with respect to certain transmission/reception bands. If desired, one or both of these antennas can also be optimized in other ways as well. For example, the transmission antenna 205 can be further optimized, if desired, for transmissions intended for a presumably stationary receiver. As another example, the reception antenna 206 can be further optimized, if desired, to receive transmissions from a presumably mobile transmitter (such as, for example, a movable barrier operator remote control transmitter located in a moving automobile).

Accordingly, for example, this transceiver 203 would use an antenna tuned to a UHF band both when receiving transmissions within the UHF band and also within an ISM band in the 900 MHz-range ISM band. This approach serves to reduce the cost and complexity of the resultant platform. Of course, this also means that the transceiver 203 is not quite as able to receive transmissions within the first discrete range 204 as compared to transmissions within the second discrete range 207. These teachings can compensate for this reduced capability by configuring the devices that transmit to this movable barrier operator 101 to employ relatively greater power when transmitting using the first discrete band 204.

Figure 3:
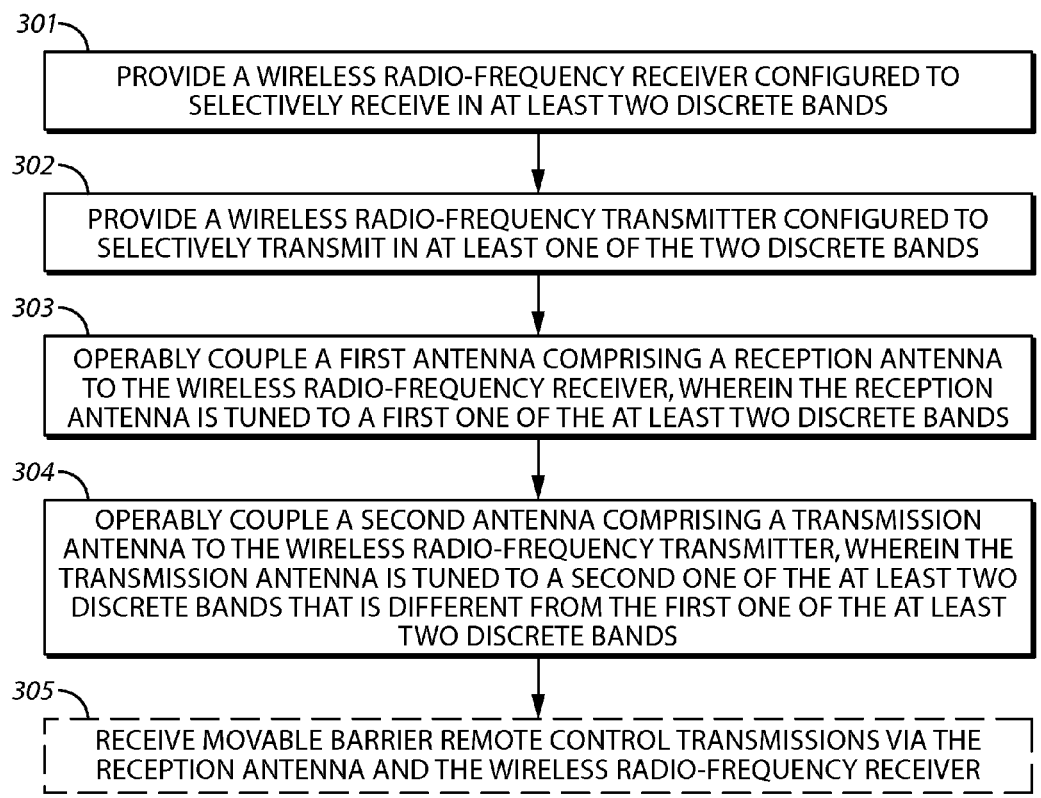
FIG. 3 comprises a flow diagram as configured in accordance with various embodiments of the invention.

As noted above, the specifics of such an example are intended to serve in an illustrative capacity and are not intended to comprise either an exhaustive presentation in these regards or a definitive limiting characterization. To underscore this point, and referring momentarily to FIG. 3, a corresponding process 300 will be presented.

Step 301 of this process 300 provides a wireless radio-frequency receiver configured to selectively receive in at least two discrete bands while step 302 provides a wireless radio-frequency transmitter configured to selectively transmit in at least one of the two discrete bands. This can mean, of course, that the wireless radio-frequency transmitter is configured to transmit in only of the two discrete bands. As a specific example already noted above, this could mean providing a receiver that can receive in both a UHF band and a 900 MHz band and providing a transmitter that can only transmit in the 900 MHz band.

Step 303 of this process 300 then provides for operably coupling a first antenna comprising a reception antenna to the wireless radio-frequency receiver, where the reception antenna is tune to a first one of the at least two discrete bands (such as the UHF band). Step 304, in turn, provides for operably coupling a second antenna (that is different from the first antenna) to the wireless radio-frequency transmitter, where the transmission antenna is tuned to a second one of the at least two discrete bands that is different than the first one of the at least two discrete bands.

So configured, of course, this process 300 will then support an optional step 305 that provides for receiving movable barrier remote control transmissions via the reception antenna and the wireless radio-frequency receiver. These transmissions can comprise, for example, encrypted movable barrier remote control transmissions (including but not limited to encryption by converting binary information into trinary information as characterizes many movable barrier remote control transmissions).

Returning again to FIG. 2, if desired, this movable barrier operator 101 can further optionally comprise one or more end-user interfaces 208 that operably couple to the control circuit 201. Examples in these regards might comprise, for example, sliding switches, push buttons, dual-in-line package (DIP) switches, a touch-screen display, and so forth). In this illustrative example, these end-user interfaces 208 comprise a part of the movable barrier operator 101 itself and therefore share, for example, the movable barrier operator's housing, chassis, and so forth.

Such a movable barrier operator 101 can also optionally comprise, as alluded to above, a motive component 209 of choice to selectively move the corresponding movable barrier 104. This motive component 209 can include, for example, an alternating current or a direct current motor.

So configured, in addition to responding appropriately to one or more transmitters 112 that traditionally employ the UHF band this movable barrier operator 101 can also wirelessly interact with any of a plurality of two-way remote platforms such as one or more light fixtures 116, obstacle detectors 115, end-user interfaces 113 (such as wall-mounted buttons, open-door indicators, or the like), and any number of other mechanisms (represented here by an Nth remote platform 210). Examples in these regards include, but are not limited to, movement sensors, infrared sensors, smoke detectors, fire detectors, light detectors, access-control mechanisms, alarm systems, and so forth.

By one approach, the transceiver 203 can operate as a frequency-hopping transceiver when using the first discrete band 204. This can comprise, for example, hopping in a predetermined sequence through a given number of predetermined carrier frequencies (such as, for example, fifty different predetermined carrier frequencies). By one approach this can comprise using a given carrier frequency for only a predetermined amount of time (such as, for example, 10 milliseconds) before hopping to the next carrier frequency in the sequence. Using a frequency-hopping methodology can assist with overcoming interference when operating in relatively unstructured spectra such as the aforementioned ISM band (as, at least in many cases, a given interferer will not identically impact every available carrier frequency within a given band).

For many application settings it can be useful for the movable barrier operator 101 to only accept instructions from, or to otherwise communicate with, remote platforms that are authorized to engage the movable barrier operator 101 in that manner. These teachings accommodate at least two approaches to such authorization. First, these teachings will facilitate a movable barrier operator learning a given remote platform. And second, these teachings will also facilitate a movable barrier operator pairing with a given remote platform. Generally speaking, learning is based upon a one-way approach to communications whereas pairing relies upon a two-way communications ability between the movable barrier operator and the remote platform.

By one approach, this can comprise initiating, via the control circuit 201, a relationship-establishment mode of operation. During this relationship-establishment mode of operation the control circuit 201 then operates in both a learn mode of operation and a pairing mode of operation. Generally speaking, this can comprise at least a presentation of credentials. By one approach this relationship-establishment mode of operation can be initiated upon detecting an end-user's assertion of the corresponding input interface (such as a particular end-user interface 208 as shown in FIG. 2). This might comprise, for example, simply detecting that the end user has asserted a specific push button. By one approach, a single push of such a button will suffice to instigate the control circuit 201 to carry out a sophisticated series of actions in these regards as described below.

In a learn mode of operation, for example, the control circuit 201 can receive (via the transceiver 203) the credentials as pertain to a given one-way remote platform. These credential might comprise, for example, a fixed identifier for this one-way remote platform along with a rolling code value. (The use of fixed identifiers that are relatively unique to a given remote platform (or, in some cases, to the control circuit 201) and rolling code values is well understood in the art. The interested reader is referred to U.S. Pat. No. 6,154,544, U.S. Pat. No. 7,492,905, U.S. Published Patent Application No. 2007/0058811, and U.S. Published Patent Application No. 2007/0005806, the full contents of each of which are hereby incorporated herein by this reference.)

In a pairing mode of operation, as another example, the control circuit 201 can again receive such credentials and/or can present its own corresponding credentials to the opposite entity. A pairing mode of operation will typically include some two-way exchange of information (at the very least, for example, some identifier for one entity that is, in turn, acknowledged by the receiving entity).

Figure 4A:
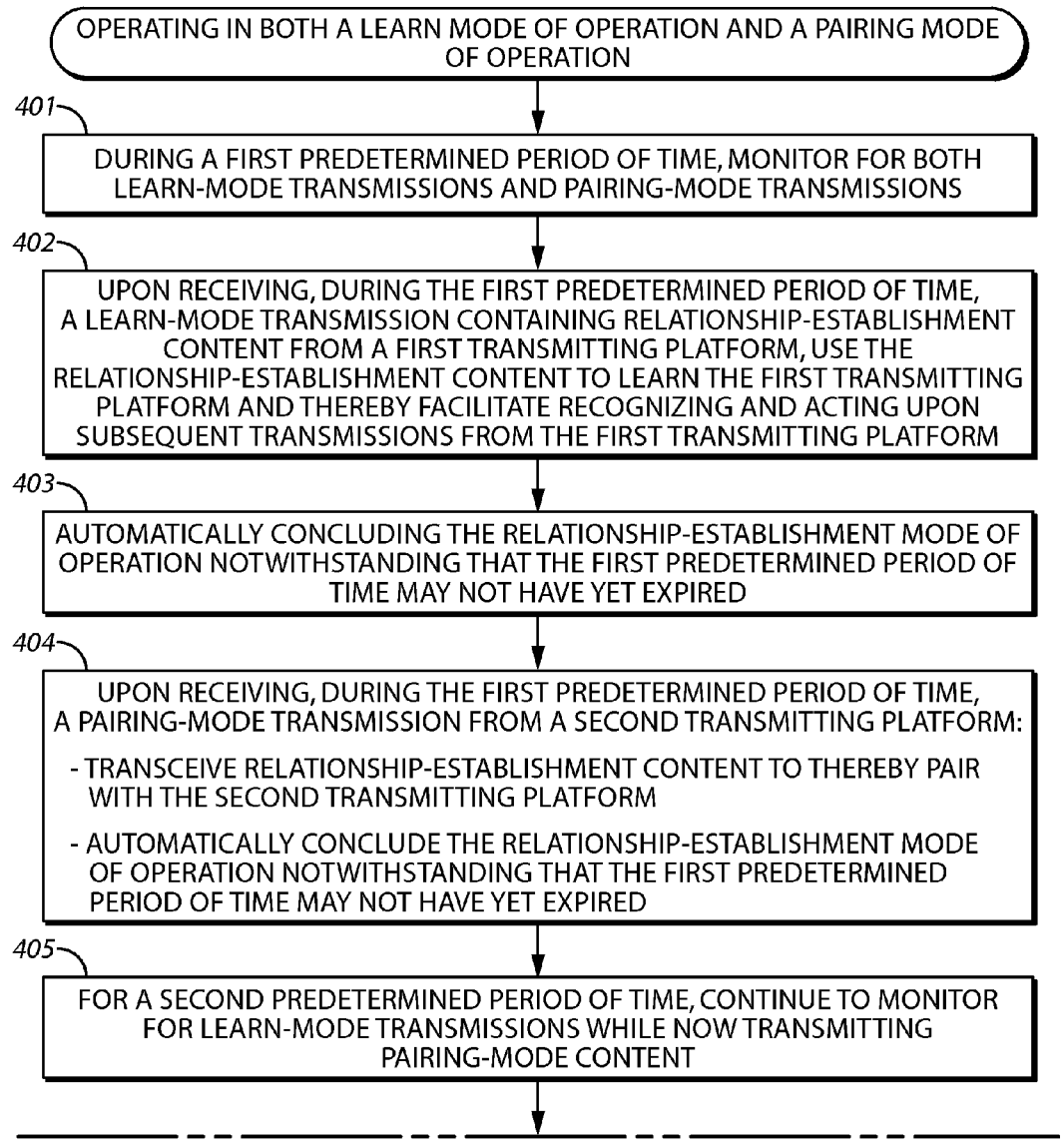
FIGS. 4A and 4B comprise a flow diagram as configured in accordance with various embodiments of the invention.
Figure 4B:
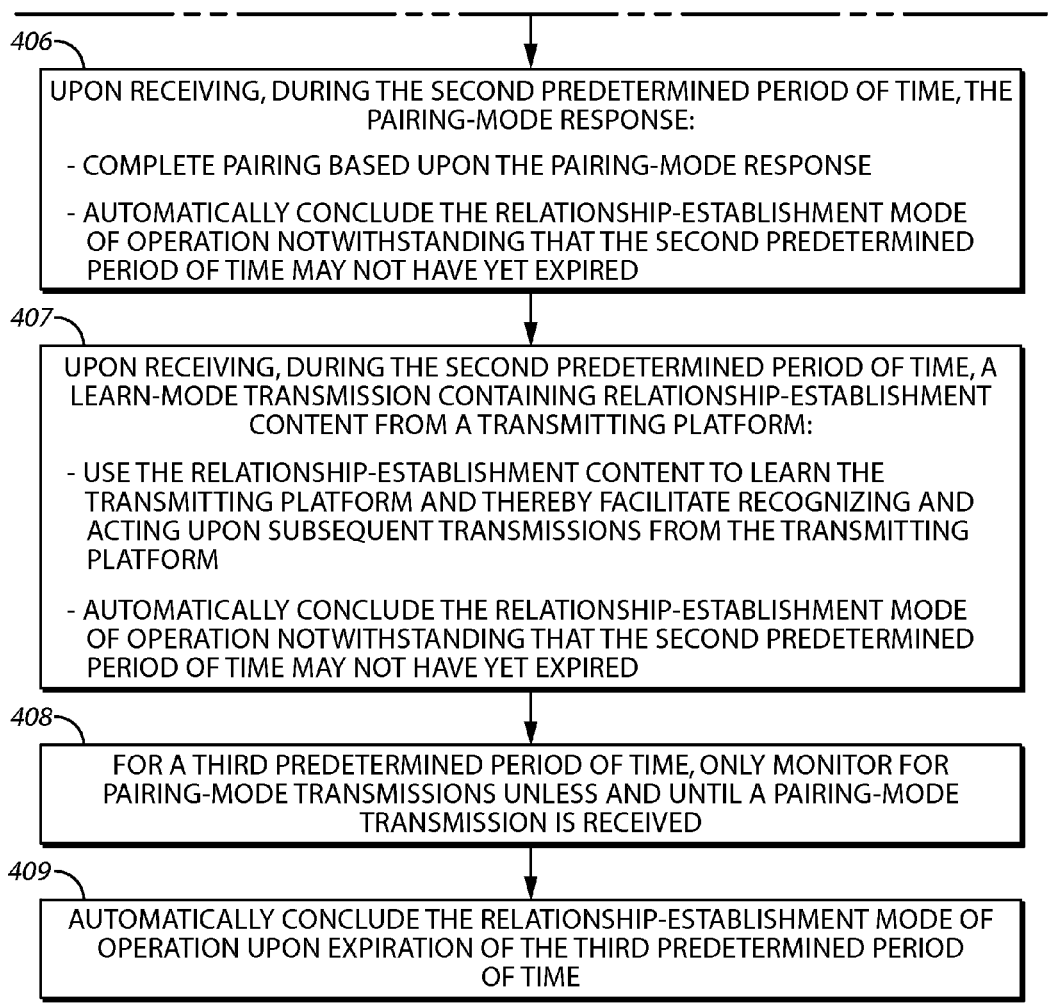

Referring now to FIGS. 4A and 4B, this can comprise utilizing a process 400 by which the aforementioned control circuit 201 implements both a learn mode of operation and a pairing mode of operation. In this particular example, the control circuit 201 conducts itself in a first manner for a first predetermined period of time. The control circuit 201 then conducts itself in a second, different manner for a subsequent predetermined period of time, followed by yet a third, different manner for a subsequent and concluding predetermined period of time. The durations of these periods of time can vary as desired. By one approach, the first period of time can be quite brief while the second and third periods of time are relatively considerably longer. If desired, the second and third periods of time can have a same or nearly the same duration. By way of illustration and without intending any limitations in these regards, the first period of time can be about three seconds and the second and third periods of time can each be about thirty seconds.

At step 401, during the first predetermined period of time the control circuit 201 monitors for both learn-mode transmissions and pairing-mode transmissions. This can comprise not transmitting during this first period of time unless and until a pairing-mode transmission is received. By one approach, learn-mode transmissions may tend to occur (or may exclusively occur) in the second discrete band 207 (such as a UHF band) while pairing-mode transmissions may tend to occur (or may exclusively occur) in the first discrete band 204 (such as a 900 MHz ISM band). In such a case, the transceiver 203 can be controlled to alternate, for example, receiving in the second discrete band 207 with transceiving in the first discrete band 204.

As a more specific example, and presuming that the first predetermined period of time is three seconds, this can comprise scanning the second discrete band 207 for a learn-mode transmission from a remote platform for some fraction of the three seconds and then switching to scanning a particular selected carrier frequency (or frequencies) of the first discrete band 204 for a pairing-mode transmission. The reception mode can toggle back and forth between a first reception band and a second reception band (that is at least partially different from the first reception band) in a temporally-interleaved manner between these two receive states until the three seconds concludes or until the transceiver 203 receives such a transmission.

At step 402, upon receiving (during this first predetermined period of time) a learn-mode transmission that contains relationship-establishment content from a first transmitting platform (such as a one-way remote platform 112), the control circuit 201 uses the content to learn the first transmitting platform to thereby facilitate recognizing and acting upon subsequent transmissions from that first transmitting platform. This would permit, for example, a traditional garage door wireless remote opener to transmit its fixed identifier and a current rolling code value to a movable barrier operator. (Those skilled in the art will recognize that this learn-mode transmission may have an identical message-field syntax as at least some subsequent transmissions although the specific contents of those fields may change from one transmission to the next; for example, a rolling code value will typically change with each episode as may a recovery identifier-specified area or areas.)

The latter could then store this information and use this information to authenticate a next transmission from this remote device. Upon authenticating that transmission the movable barrier operator could then validly respond, for example, to an "open" command by causing its movable barrier to move from a closed position to an open position.

Upon learning a remote device in this manner, step 403 provides for automatically concluding the relationship-establishment mode of operation notwithstanding that the first predetermined period of time may not have yet expired. These teachings would accommodate other approaches here if desired. For example, this step of monitoring for both learn-mode and pairing-mode transmissions could continue for any remaining portion of the first predetermined period of time.

As noted, step 401 provides for monitoring for both learn-mode and pairing-mode transmissions. Accordingly, it is possible that a pairing-mode transmission rather than a learn-mode transmission may be received. In this case, at step 404, upon receiving (during the first predetermined period of time) a pairing-mode transmission from a second transmitting platform (which likely, but not necessarily, is different from the aforementioned first transmitting platform), the control circuit 201 can transceive relationship-establishment content with the second transmitting platform to thereby pair with that second transmitting platform. By one approach, and as shown here, the control circuit 201 can then automatically conclude this relationship-establishment mode of operation notwithstanding that the first predetermined period of time may not have yet expired.

To summarize, during a first predetermined period of time (such as about three seconds), the control circuit 201 can utilize the transceiver 203 to switch back and forth between receiving the first discrete band 207 to monitor for learn-mode transmissions and the second discrete band 204 to monitor for pairing-mode transmissions. The control circuit 201 prompts no transmissions during this time unless and until a transmission becomes appropriate upon receiving a pairing-mode transmission.

Upon concluding this first predetermined period of time without receiving either a learn-mode transmission or a pairing-mode transmission, at step 405 the control circuit 201, for a second predetermined period of time (such as about thirty seconds), continues to monitor for learn-mode transmissions while now transmitting pairing-mode content.

By one approach, this can comprise again alternating monitoring for learn-mode transmissions via the second discrete band 207 with transmitting the pairing-mode content via the first discrete band 204. More particularly, when employing a frequency-hopping methodology in the first discrete band 204 as suggested above, this can comprise briefly transmitting the pairing-mode content using a first frequency carrier within the first discrete band 204 and then briefly monitoring for a pairing response from a two-way remote platform. In the absence of such a response the pairing-mode content can again be briefly transmitted using a second frequency carrier as per the frequency-hopping sequence followed again by briefly monitoring that second frequency carrier for a response. This iterative use of a sequence of frequency carriers can be repeated many times, if desired, before switching to the second discrete band 207 to scan for a learn-mode transmission.

At step 406, if and when the control circuit 201 receives, during the second predetermined period of time, a pairing-mode response, the control circuit 201 can facilitate completing the pairing based upon the pairing-mode response. By one approach, if desired, this step 406 can then provide for automatically concluding the relationship-establishment mode of operation notwithstanding that the second predetermined period of time may not have yet expired.

Somewhat similarly, at step 407, if and when the control circuit 201 instead receives, during the second predetermined period of time, a learn-mode transmission containing relationship-establishment content from a transmitting platform, the control circuit 201 can responsively use that relationship-establishment content to learn the transmitting platform and thereby facilitate recognizing and acting upon subsequent transmissions from that transmitting platform. By one approach, if desired, this step 407 can then provide for automatically concluding the relationship-establishment mode of operation notwithstanding that the second predetermined period of time may not have yet expired.

If, instead, the second predetermined period of time shall expire without the transceiver 203 having receiving either learn-mode content or a pairing-mode response to its own pairing-mode transmissions, at step 408 the control circuit 201 can now only monitor for pairing-mode transmissions (unless and until a pairing-mode transmission is received) for a third predetermined period of time (such as, for example, about thirty seconds). As before, if and when a transmitting platform shall respond to such a pairing-mode transmission with its own pairing-mode response, the control circuit 201 can then pair with that transmitting platform and, if desired, automatically conclude this process 400 notwithstanding that the third period of time may not have yet expired.

If the third period of time shall conclude while the process 400 is still active, at step 409 the control circuit 201 then automatically concludes this relationship-establishment mode of operation and returns, for example, to its ordinary stand-by mode of operation.

These teachings are highly flexible in practice and will accommodate a wide variety of variations with respect to that presented above. As but one example in these regards, upon completing a learn-mode of operation during the aforementioned process 400 and in lieu of automatically concluding the relationship-establishment mode of operation this process 400 can provide instead for switching to only operating using the pairing-mode of operation during a remainder of the relationship-establishment mode of operation. By one approach this can continue as stated unless and until the transceiver 203 receives a pairing-mode transmission. This exclusive use of only the pairing-mode of operation can comprise, as desired, transmitting pairing-content and waiting for a corresponding pairing response (regardless of whether a pairing-mode transmission is actually received) or only monitoring for a pairing-mode transmission (in which case a pairing-mode transmission can be offered in response).

Such an approach (i.e., switching to a pairing-mode of operation following completion of a learn-mode of operation) can facilitate establishing a full relationship with a given platform that utilizes both traditional one-way remote-control transmissions and two-way data communications. In such a case, this approach will permit the control circuit 201 to both learn this given platform and to pair with this given platform during a single relationship-establishment mode of operation as instigated, for example, by a single push of a button by an end user.

This process 400 can also be modified, in lieu of the foregoing or in combination therewith, to switch to only operating using the learn mode of operation during a remaining portion of the relationship-establishment mode of operation upon completing the pairing mode of operation for a given platform. This can comprise, for example, only monitoring for learn-mode transmissions during a remaining portion of the relationship-establishment mode of operation under such circumstances.

If desired, these approaches (i.e., switching from a first mode of operation (either the learn-mode of operation or the pairing-mode of operation) following completion of second mode of operation) can be conditioned upon the particulars of the given platform. For example, when transmitting learn content and/or pairing content, this given platform can include information regarding itself in these regards. This information could be as simple as a single bit that serves to flag whether the given platform uses only a single relationship-establishment mechanism (i.e., learning or pairing) or both. The control circuit 201 could then utilize that information to determine whether to switch to an alternative relationship-establishment mechanism upon establishing a relationship with the given platform using a first mechanism in these regards.

The foregoing permits remote platforms to establish a relationship with, for example, a movable barrier operator. This, in turn, allows the movable barrier operator to trust transmissions from the remote platforms. This trust can be leveraged by having the movable barrier operator act in accordance with instructions and/or data as received from these remote platforms.

Figure 5:
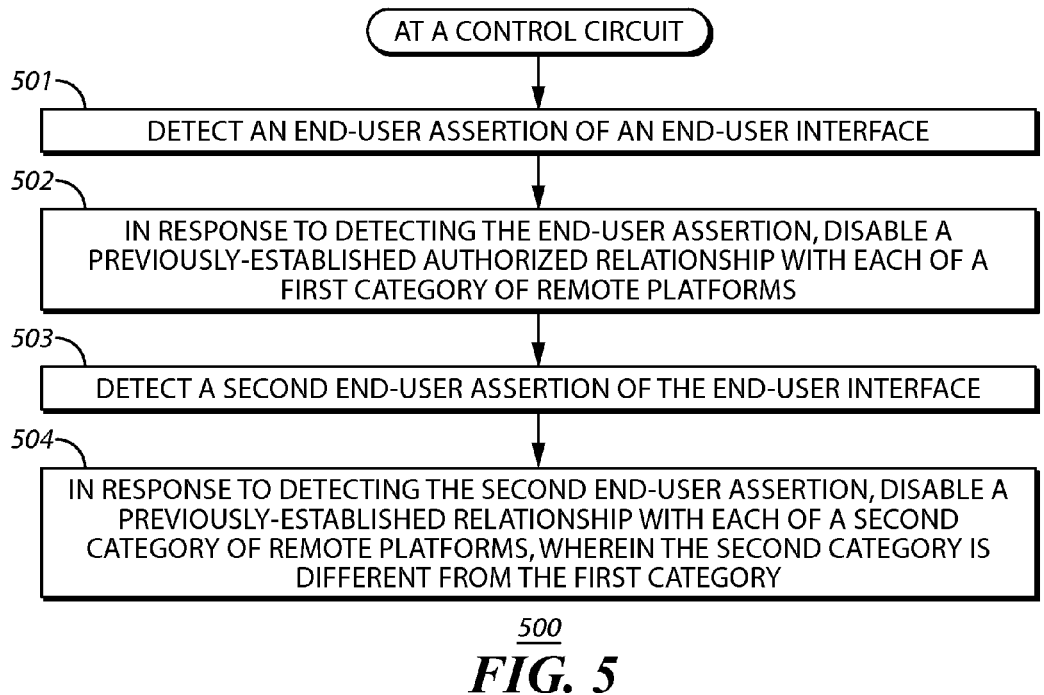
FIG. 5 comprises a flow diagram as configured in accordance with various embodiments of the invention.

That a given remote platform may be trusted at one point in time, however, does not mean that such trust shall persist indefinitely. Accordingly, it can be useful to provide a mechanism to support disabling a previously-established authorized relationship with one or more remote platforms. FIG. 5 depicts some approaches in these regards.

Pursuant to this process 500, at step 501 the control circuit 201 detects an end-user assertion of an end-user interface 208. This can comprise, for example, the end user asserting a push button. By one approach, this can require that the end user assert the end-user interface 208 for at least some particular duration of time (such as, for example, two seconds, six seconds, or some other duration of choice). A relatively lengthy duration requirement (such as at least six seconds) can help, in some application settings, to avoid inadvertently disabling previously-established authorized relationships.

At step 502, and in response to detecting the end-user's assertion of the end-user interface 208, the control circuit 201 can disable all previously-established authorized relationships for each of a first category of remote platforms. By one approach, for example, this first category of remote platforms can comprise previously learned relationships (as versus, for example, previously paired relationships). Or, if desired, this first category of remote platforms could comprise all previously paired relationships (as versus, for example, previously learned relationships).

By one approach, this disablement can comprise erasing the relationship information from the memory 202 of the apparatus. By another approach, if desired, this disablement can comprise tagging or flagging the relationship information in some manner of choice to permit the control circuit 201 to identify that information as no longer being honored.

So configured, a complete group of previously-learned relationships can be categorically disabled with a single end-user assertion of an end-user interface 208. This can yield considerable savings in time when the end user seeks to disable a relatively large number of previously-established authorized relationships (such as, for example, five, twenty-five, or one hundred previously-established authorized relationships).

At step 503 this process 500 can next detect a second end-user assertion of that same end-user interface 208. By one approach this can comprise that the end user has asserted this end-user interface 208 within some predetermined amount of time (such as one second, three seconds, six seconds, or some other duration of choice) of having previously asserted the end-user interface 208. This approach can also comprise, in lieu of the foregoing or in combination therewith, determining that the end user has asserted the end-user interface 208 a second time for at least a second particular duration of time (such as one second, three seconds, six seconds, or the like). If desired, this required duration of time can match the duration of time required at step 501 when such is the case.

If desired, this "second" end-user assertion can comprise detecting that the end user continues to assert the end-user interface 208 beyond a time duration associated with detecting the aforementioned first end-user assertion and for at least some further required period of time. For example, to detect a first end-user assertion it may be required that the end user assert the end-user interface 208 for at least six seconds and to detect the second end-user assertion it may be required that the end user continues to assert the end-user interface 208 for at least an additional six seconds.

In response to detecting this second end-user assertion, at step 504 the control circuit 201 can disable previously-established relationships with each of a second category of remote platforms (where the second category is different from the first category). By one approach, for example, the first category can consist of learned relationships while the second category consists of paired relationships.

So configured, by use of a single end-user interface 208 and potentially by a single end-user assertion of that interface 208, this process 500 will permit an end user to disable all previously-established authorized relationships with remote platforms as belong to a first category of such relationships as well as all previously-established authorized relationships with remote platforms as belong to a second category of such relationships. This process 500 will also permit this end user to be more selective in these regards and to disable only the relationships that comprise one of these categories but not both.

This process 500 will accommodate a wide variety of variations that may be useful in a particular application setting. For example, by one approach, the end user can manipulate the end-user interface 208 to select the particular category of previously-established relationships is to be first disabled. As one simple example in these regards, the end user could assert this same end-user interface 208 twice in quick succession to signal that a subsequent assertion of the end-user interface 208 is to result at step 502 in disablement of the previously-established authorized relationships as comprise the second category rather than the first category.

As another example in these regards, a first assertion of the end-user interface 208 can be detecting as a "second" assertion of the end-user interface 208 at step 503 when the end user asserts the end-user interface 208 at a time where there is no extant previously-established authorized relationship with the first category of remote platform.

There can be other circumstances when it may be useful to accommodate purposefully disabling a previously-established authorized relationship. For example, an installer or service technician may employ a service tool that requires a temporary established relationship with a given movable barrier operator in order to facilitate its operational functionality. In such a case the movable barrier operator can learn and/or pair with the service tool to establish the necessary relationship.

Figure 6:
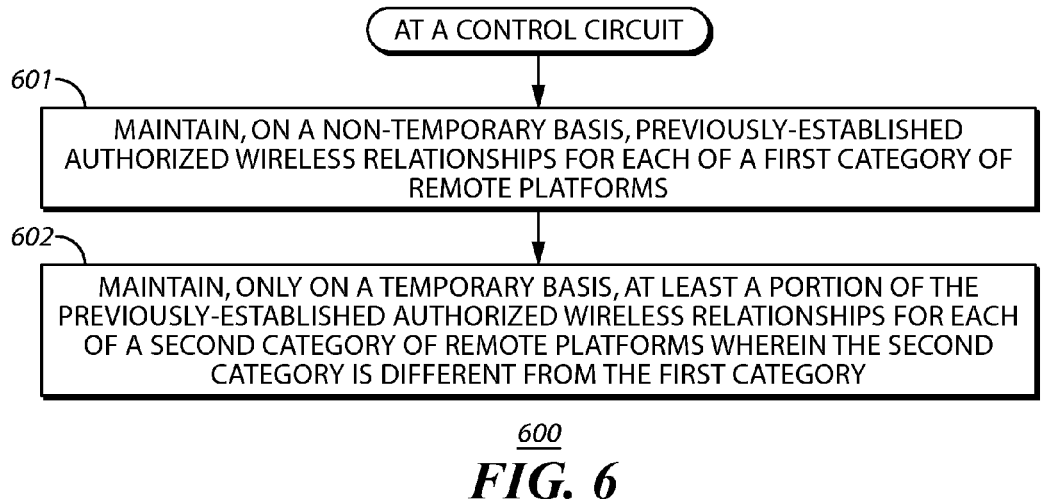
FIG. 6 comprises a flow diagram as configured in accordance with various embodiments of the invention.

In this case, however, and referring now to FIG. 6, step 601 of the illustrated process 600 provides for maintaining, on a non-temporary basis, previously-established authorized wireless relationships for each of a first category of remote platforms (these comprising remote platforms, for example, other than service tools that only require a temporary relationship) while step 602 provides for maintaining, only on a temporary basis, at least a portion of the previously-established authorized wireless relationships for each of a second category of remote platforms (where the second category is of course different from the first category and can include, for example, service tools that only requires temporary access to and cooperation with the movable barrier operator).

As used herein, the word "temporary" will be understood to refer to a period of time of set duration (such as one minute, five minutes, fifteen minutes, one hour, or such other duration of choice). Accordingly, "non-temporary" will be understood to refer to a period of time of unlimited duration in that the duration is unspecified. For example, the first category of remote platforms can be maintained on a non-temporary basis by maintaining these relationships until specifically instructed otherwise by an external source (such as the end user as per, for example, the procedures described above).

As another example in these regards, the relationships for the second category of remote platforms can be maintained only as a function of at least one external input to the control circuit 201 (such as, for example, a command input to operate the control circuit 201 to cause a movable barrier to move). Using this approach, and by way of an illustrative example, a movable barrier operator will maintain a relationship with a service tool unless and until the movable barrier operator receives a command from other than the service tool (hence an "external" input) to open or close the movable barrier that the movable barrier operator controls. Upon receiving such a command, it may be presumed that normal operation has commenced and that the relationship with the service tool can be terminated.

By one approach, step 602 can comprise automatically disabling the second category of remote platforms after a predetermined period of time by, for example, partially or completely erasing the corresponding information from memory. This step will also accommodate other approaches in these regards, however, such as using flags or tags to denote the disabled or now-unauthorized status of the relationship.

As noted above, these teachings readily facilitate the employment of two-way data communications between, for example, a movable barrier operator and any number of remote platforms. These data communications can facilitate both giving and receiving instructions (for example, to open the movable barrier or to switch on a light) as well as providing status information (for example, that the movable barrier is open, that a light is on, or that smoke is sensed). By one approach, these components can utilize an acknowledgement (ACK)-based communications protocol to confirm receipt of a given transmission. If desired, an acknowledgement message can comprise a required element for essentially all received transmissions to ensure a reliable transference of content. This acknowledgement message can comprise a simple mere acknowledgement of having received a prior transmission (perhaps coupled with an identifier (or even an updated rolling code value) for the acknowledging platform). Or, if desired, this acknowledgement message can comprise more elaborate content (such as, for example, a verbatim presentation of the received content to permit a comparison of the information as received by the acknowledging platform with the information as originally transmitted to the acknowledging platform).

Such an acknowledgement scheme can be further leveraged, if desired, to support other system functionality. For example, a movable barrier operator may have timer-to-close functionality (where the movable barrier operator automatically closes a movable barrier at some particular time (such as five minutes) after the movable barrier opens) and/or remote-close functionality (where the movable barrier operator responds to a remote control instruction from a source that is not physically present at the movable barrier) that relies upon an ability to provide a signal (such as a flashing light) to alert persons who might be in the area of the movable barrier before actually closing the movable barrier in an unattended manner. In such a case, a message (such as an acknowledgement message) from the light fixture can provide the movable barrier operator with the required assurance that the necessary visual signal is available before acting upon such functionality.

Figure 7:
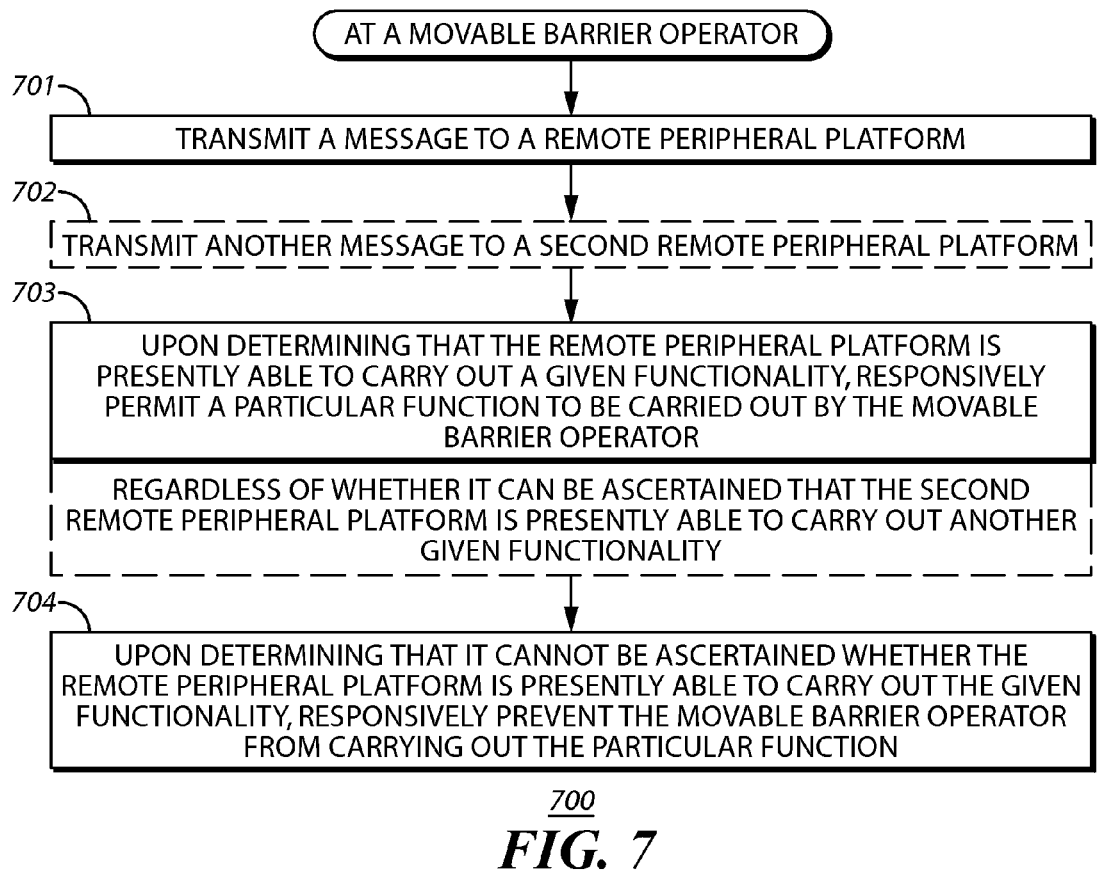
FIG. 7 comprises a flow diagram as configured in accordance with various embodiments of the invention.

FIG. 7 presents one illustrative example in these regards. At step 701 of this process 700, the control circuit 201 transmits a message to a remote peripheral platform (such as, but not limited to, a light fixture 116 as shown in FIG. 2). This can, of course, comprise a wireless transmission. The message itself can be particularly targeted to this particular remote peripheral platform or can be more generally directed to a group of remote platforms that includes this particular remote peripheral platform.

(Optional step 702 illustrates that the control circuit 201 can also transmit another message (or messages) to a second remote peripheral platform (or platforms) as desired. This second remote peripheral platform might comprise, for example, a second light fixture, an audible-announcing fixture, or essentially any other remote platform of choice.

The message itself can comprise a specific instruction and/or status content as desired.

In any event, at step 703 the control circuit 201 determines that the remote peripheral platform is presently able to carry out a given functionality. For example, when the remote peripheral platform comprises a light fixture, this can comprise determining that the light fixture is presently available and able to respond to the control circuit's command to flash a warning/alert light. By one approach, this determination can be based, at least in part, upon receiving an acknowledgement transmission (as described above) from the remote peripheral platform in response to the aforementioned message.

Upon making this determination, this step 703 then provides for responsively permitting a particular function to be carried out by the movable barrier operator. This can comprise, for example, permitting the movable barrier operator to carry out a timer-to-close function or a remote-close function. This can also comprise, if desired, having the remote peripheral platform carry out the given functionality (for example, by having the light fixture flash its light as a visual warning that the movable barrier is about to imminently carry out an automatic closure of the movable barrier).

As noted above, this process 700 can optionally include transmissions to other remote peripheral platforms. When these other remote peripheral platforms are not required or otherwise critical to the particular function to be carried out by the movable barrier operator, step 703 can optionally be carried out as described regardless of whether it can be ascertained that the second remote peripheral platform is presently able to carry out another given functionality. This can be useful, for example, when the second remote peripheral platform comprises a secondary light fixture and where an automated unattended barrier closure can be carried out safely regardless of whether the secondary light fixture is available or not.

Conversely, at step 704 and when the control circuit 201 determines that it cannot ascertain whether the remote peripheral platform is presently able to carry out the given functionality, the control circuit 201 can responsively prevent the movable barrier operator from carrying out the particular function. Accordingly, and by way of example, a failure to receive an acknowledgement transmission (for example, with a predetermined period of time, such as 500 milliseconds, one second, five seconds, or some other duration of choice) from the remote peripheral platform in response to the aforementioned transmitted message can provide a basis for prohibiting the given functionality.

As noted above, by one approach each wireless communication (or at least those that presume a two-way operational paradigm) can require a corresponding acknowledgement from the intended recipient. In the absence of such an acknowledgement, the source platform can repeat the original transmission (presuming that the original transmission failed to reach the intended recipient). While effective in many application settings to ensure that a given intended recipient in fact receives a particular transmission, such an approach can also occasion other problems. For example, the intended recipient may be unavailable for some extended period of time (due, for example, to a local power outage, a long-lived powerful interferer, damage, and so forth). In such a case, repeating the original transmission over and over again because of a lack of an acknowledgement can unduly burden the available bandwidth and potentially interfere with the overall operation of the system.

Figure 8:
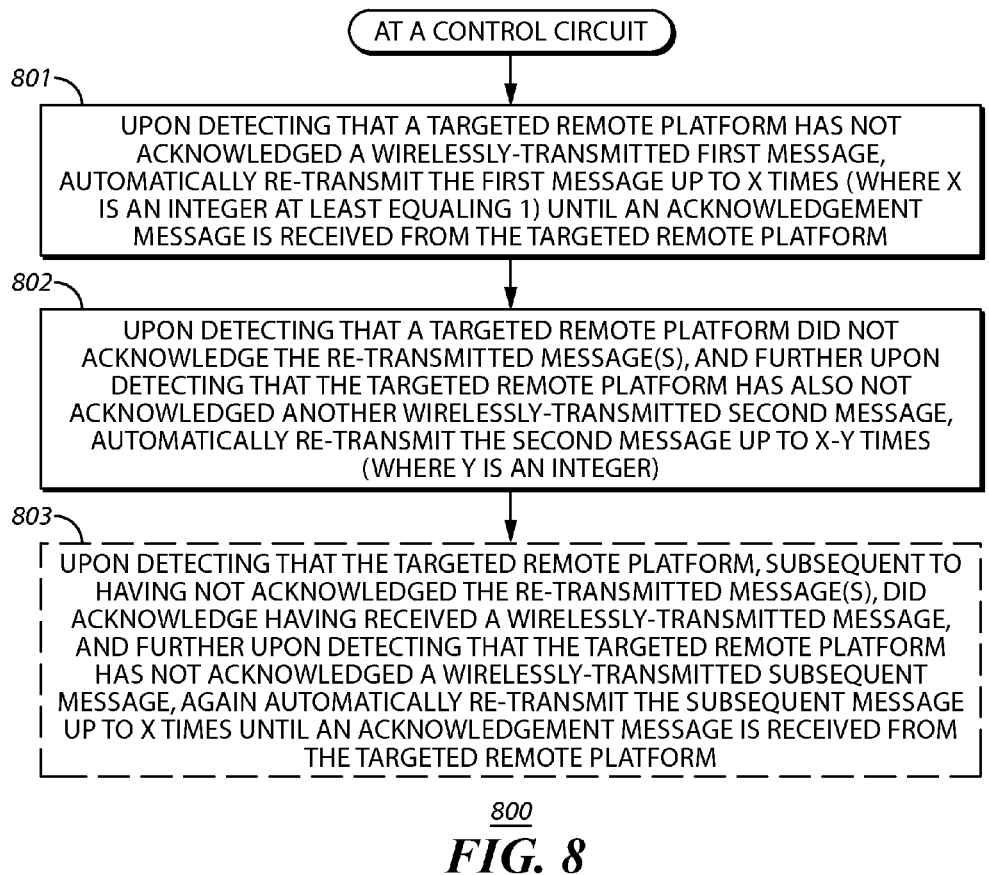
FIG. 8 comprises a flow diagram as configured in accordance with various embodiments of the invention.

FIG. 8 presents one process 800 to effectively deal with such a situation. At step 801 of this process 800 and upon detecting that a targeted remote platform has not acknowledged a wirelessly-transmitted first message, the control circuit 201 automatically re-transmits that first message up to X times (where X is an integer at least equaling "1") until an acknowledgement message is received from the targeted remote platform. This might comprise, for example, re-transmitting this message a total of, say, four times. The timing interval between these repeated transmissions can be statically or dynamically determined as desired.

At step 802, upon then detecting that the targeted remote platform did not acknowledge any of these re-transmitted messages, and further upon detecting that the targeted remote platform has also not acknowledged another wirelessly-transmitted second message, the control circuit 201 then automatically re-transmits this second message only up to X-Y times (where Y is an integer no greater than X). As an illustrative but non-limiting example in these regards, when X is set to "4" and Y is set to "2," this step 802 will adjust the number of re-transmissions under these circumstances to only two repetitions rather than the usual four repetitions.

Accordingly, so configured, the control circuit 201 becomes more sparing of its use of available system resources when a given intended recipient repeatedly fails to acknowledge a series of independent messages. By one approach, Y can be set to equal X. In this case, under the circumstances described, step 802 will prevent the control circuit 201 from providing even a single re-transmission of an unacknowledged transmission.

Eventually, of course, this intended recipient will again begin receiving and acknowledging its messages. Accordingly, at optional step 803, upon detecting that the targeted remote platform (subsequent to having not acknowledged re-transmitted messages) did acknowledge having received a wirelessly-transmitted message, and further upon detecting that the targeted remote platform has now again not acknowledged a wireless-transmitted subsequent message, the control circuit 201 can again automatically re-transmit the subsequent message up to X times until an acknowledgement message is received from the targeted remote platform. In other words, operationally, this process 800 can begin anew under such circumstances.

By one approach, if desired and as a part of step 802, this process 800 can revert to step 801 as a function of time even though the targeted recipient still fails to acknowledge received messages. For example, if the targeted recipient continuously fails to acknowledge messages for a period of twelve hours, it may be useful to more aggressively re-transmit unacknowledged messages to this targeted recipient on a temporary basis in an attempt to better the situation.

By one approach, if desired, this process 800 can be modified to incrementally decrement the number of attempted re-transmissions at step 802. For example, initially, when X equals 4, Y may be set to 1 so that up to three re-transmissions are attempted. With a next message that the target fails to acknowledge, Y can then be set to 2 so that only up to two re-transmissions are attempted. This can continue until Y equals some particular stable value which the control circuit 201 employs thereafter as described.

Another problem that can occasionally arise when mandating acknowledgment messages is that a number of platforms can all attempt to transmit their required acknowledgement at the same time with one another. This can lead to signal collisions that prevent successful reception of some or all of the colliding messages. This, in turn, can lead to unwarranted re-transmissions of the original message in order to elicit a corresponding acknowledgement which again leads to another round of acknowledgement message collisions.

To assist in these regards these teachings will accommodate temporally parsing a given carrier frequency into a plurality of time slots. Certain of these time slots can be assigned to two-way remote platforms that have an established relationship with the movable barrier operator 101. As a simple example in these regards, each carrier frequency opportunity can be parsed into twenty-two equally-sized transmit/receive pairs of time slots. A first such pair of time slots can be assigned to a remote platform that has also been assigned the network identifier "1." A second such pair of time slots can be similarly assigned to a remote platform that has been assigned the network identifier "2." Such a one-for-one assignment protocol can serve to pre-assign up to twenty-two remote platforms to a corresponding pair of time slots.

This time slotting, however, need not always dictate the transmission behavior of the remote platforms. Instead, if desired, the remote platforms may be permitted to unilaterally transmit at essentially any time during this parsed period of time when self-sourcing a specific communication (such as when providing an end-user instruction to a movable barrier operator or when reporting a monitored condition (such as the detected presence of an obstacle in the pathway of a moving movable barrier)). Such asynchronous transmissions can be readily accommodated in most application settings due to a likelihood of relatively low levels of traffic on the one hand and the aforementioned acknowledgement protocol that will tend to assure that the transmitting platform will re-transmit its message until an appropriate acknowledgement is received.

Figure 9:
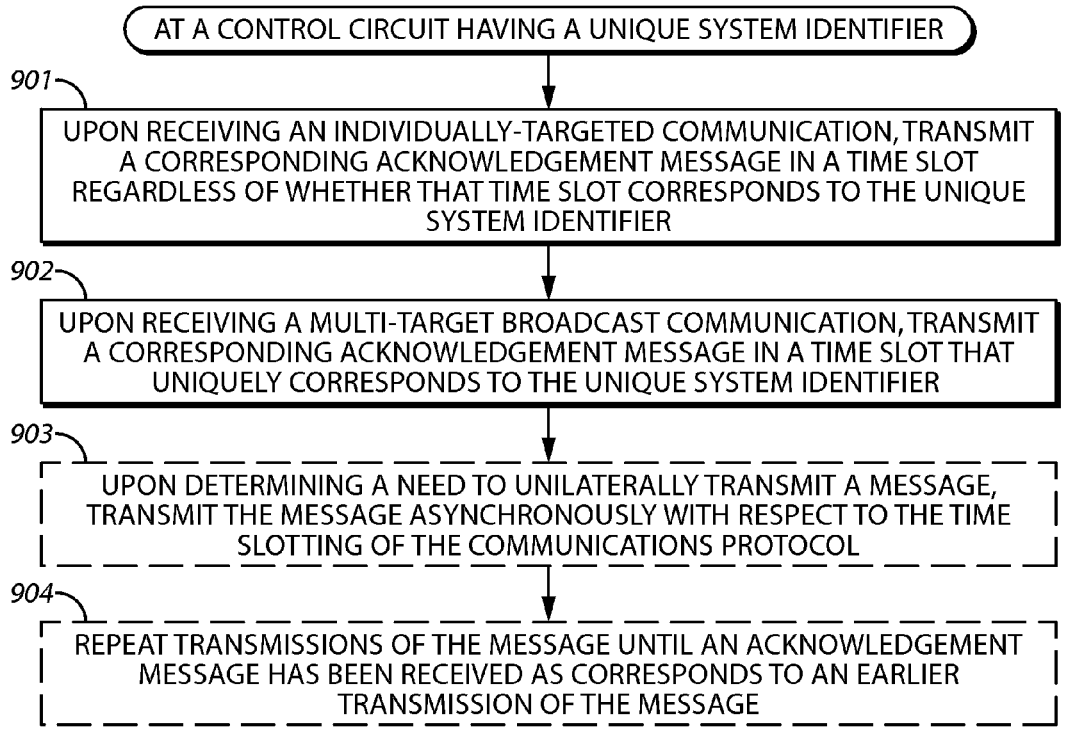
FIG. 9 comprises a flow diagram as configured in accordance with various embodiments of the invention.

That said, there are other scenarios where observation of the aforementioned time slots can be required on the part of the remote platforms. FIG. 9 presents an illustrative process 900 in these regards. This particular process 900 is particularly useful when implemented by a control circuit (including control circuits at remote platforms) having a unique system identifier (as assigned, for example, by a movable barrier operator and where that unique system identifier can be correlated (one-on-one) with a given time slot (which can include a pair of time slots to accommodate both transmissions and receptions, respectively).

Presuming such a configuration, at step 901 the control circuit receives an individually-targeted communication directed to itself. In response, this step 901 provides for transmitting a corresponding acknowledgement message in a time slot as defined by the above-described time slot-based protocol but without concern for whether the particular utilized time slot is one that has been previously correlated with and assigned to this particular control circuit/remote platform. Accordingly this acknowledgement message is transmitted in a time slot of convenience (such as a next-occurring time slot) regardless of whether that time slot corresponds to the unique system identifier as corresponds to this control circuit.

So configured, the control circuit can quickly respond with its acknowledgement upon receiving a communication that is individually targeted to that control circuit (i.e., that remote platform). Under the circumstances this approach is not especially likely to lead to a transmission collision as there is no particular anticipated reason why another remote platform would also be trying to transmit its own acknowledgement message at this time and, as noted above, traffic conditions will likely be otherwise relatively light in many application settings.

These teachings will also accommodate, however, a multi-target broadcast communication in addition to individually-targeted communications. Such a multi-target broadcast might be received, for example, by twenty or so remote platforms (and/or movable barrier operators). Per the dictates of the described protocol, each of these platforms is expected to respond with a corresponding acknowledgement.

Now, of course, having each of the remote platforms utilize a next-occurring time slot is considerably more likely to lead to transmission collisions. A similar result can be expected if these platforms are permitted to respond ad hoc without concern for the time slotting protocol.

Accordingly, to aid with avoiding such collisions, at step 902 this process 900 provides under such circumstances for transmitting the corresponding acknowledgement message in a time slot that uniquely corresponds to the unique system identifier (in other words, in the transmission time slot that has been previously assigned to this particular control circuit/remote platform. Such an approach will tend to assure that each acknowledging platform will transmit in a non-overlapping manner with the other acknowledging platform, hence avoiding collisions.

So configured, these teachings provide for an efficient and cost-effective approach to supporting two-way wireless data communications. What is more, these approaches are flexible in practice and can readily accommodate a variety of regulatory requirements or guidelines as may pertain to a given application setting.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
at a control circuit of a communication device:
initiating a relationship-establishment mode of operation of the communication device in response to a user assertion to establish a relationship with a second communication device;
during the relationship-establishment mode of operation, operating in both a learn-mode of operation that enables the communication device to receive credentials from the second communication device in response to the second communication device being a one-way remote platform and a pairing-mode of operation that enables the communication device to send credentials to and receive credentials from the second communication device in response to the second communication device being a two-way remote platform;
wherein operating in both the learn-mode of operation and the pairing-mode of operation comprises, during a first predetermined period of time, monitoring for both learn-mode transmissions and pairing-mode transmissions in a temporally-interleaved manner.

2. The method of claim 1 wherein the control circuit comprises a part of a movable-barrier operator.

3. The method of claim 1 wherein initiating the relationship-establishment mode of operation comprises detecting the user assertion of a corresponding input interface.

4. The method of claim 3 wherein detecting the user assertion of the corresponding input interface comprises detecting that the user has asserted a button.

5. The method of claim 4 wherein only a single user assertion of the button will suffice to detect that the user has asserted the button.

6. The method of claim 1 wherein operating in both the learn-mode of operation and the pairing-mode of operation comprises, during a first predetermined period of time, monitoring for a transmission from both a learn-mode device and a pairing-mode device.

7. The method of claim 1 wherein monitoring for both the learn-mode transmissions and the pairing-mode transmissions in the temporally-interleaved manner comprises:
monitoring for the learn-mode transmissions in a first reception band;
monitoring for the pairing-mode transmissions in a second reception band that is at least partially different from the first reception band.

8. The method of claim 7 wherein the second reception band is fully non-coincident with the first reception band.

9. The method of claim 8 wherein the first reception band comprises an ultra-high frequency band and the second reception band comprises an industrial, scientific, and medical (ISM) band.

10. The method of claim 9 wherein the ISM band comprises a 900 MHz-range ISM band.

11. The method of claim 1 wherein, during the first predetermined period of time, monitoring for both the learn-mode transmissions and the pairing-mode transmissions comprises not transmitting via the control circuit unless and until a pairing-mode transmission is received.

12. The method of claim 11 further comprising, upon receiving, during the first predetermined period of time, a learn-mode transmission containing relationship-establishment content from a first transmitting platform, using the relationship-establishment content to learn the first transmitting platform and thereby facilitate recognizing and acting upon subsequent transmissions from the first transmitting platform.

13. The method of claim 12 wherein the learn-mode transmission and at least some of the subsequent transmissions use an identical message-field syntax.

14. The method of claim 12 further comprising, upon using the relationship-establishment content to learn the first transmitting platform, automatically concluding the relationship-establishment mode of operation notwithstanding that the first predetermined period of time may not have yet expired.

15. The method of claim 14 further comprising, upon receiving, during the first predetermined period of time, a pairing-mode transmission from a second transmitting platform:
transceiving relationship-establishment content to thereby pair with the second transmitting platform;
automatically concluding the relationship-establishment mode of operation notwithstanding that the first predetermined period of time may not have yet expired.

16. The method of claim 15 wherein the first predetermined period of time comprises about three seconds.

17. A method comprising:
at a control circuit of a communication device:
initiating a relationship-establishment mode of operation of the communication device to establish a relationship with a second communication device;
during the relationship-establishment mode of operation, operating in both a learn-mode of operation and a pairing-mode of operation, wherein operating in both a learn-mode of operation and a pairing-mode of operation comprises:
during a first predetermined period of time, monitoring for both learn-mode transmissions and pairing-mode transmissions; and
during a second predetermined period of time, subsequent to the first predetermined period of time, continuing to monitor for learn-mode transmissions while now transmitting pairing-mode content.

18. The method of claim 17 wherein the transmitting of the pairing-mode content occurs unless and until the control circuit receives a transmitted pairing-mode response to the transmitting of the pairing-mode content.

19. The method of claim 18 further comprising, upon receiving, during the second predetermined period of time, the pairing-mode response:
completing pairing based upon the pairing-mode response;
automatically concluding the relationship-establishment mode of operation notwithstanding that the second predetermined period of time may not have yet expired.

20. The method of claim 19 further comprising, upon receiving, during the second predetermined period of time, a learn-mode transmission containing relationship-establishment content from a transmitting platform:

using the relationship-establishment content to learn the transmitting platform and thereby facilitate recognizing and acting upon subsequent transmissions from the transmitting platform;

automatically concluding the relationship-establishment mode of operation notwithstanding that the second predetermined period of time may not have yet expired.

21. The method of claim 17 wherein the second predetermined period of time is substantially longer than the first predetermined period of time.

22. The method of claim 21 wherein the second predetermined period of time is at least five times longer than the first predetermined period of time.

23. The method of claim 22 wherein the second predetermined period of time is at least ten times longer than the first predetermined period of time.

24. The method of claim 23 wherein the first predetermined period of time is about three seconds and the second predetermined period of time is about thirty seconds.

25. The method of claim 17 further comprising, as part of operating in both the learn mode of operation and the pairing mode of operation, and subsequent to the second predetermined period of time and for a third predetermined period of time, only monitoring for pairing-mode transmissions unless and until a pairing-mode transmission is received.

26. The method of claim 25 further comprising, upon receiving, during the third predetermined period of time, a pairing-mode transmission from a transmitting platform:
transceiving relationship-establishment content to thereby pair with the transmitting platform;
automatically concluding the relationship-establishment mode of operation notwithstanding that the third predetermined period of time may not have yet expired.

27. The method of claim 25 further comprising automatically concluding the relationship-establishment mode of operation upon expiration of the third predetermined period of time.

28. The method of claim 27 wherein the second and third predetermined periods of time are substantially longer than the first predetermined period of time.

29. The method of claim 28 wherein the second and third predetermined periods of time are at least approximately of a same duration.

30. The method of claim 29 wherein the first predetermined period of time is about three seconds and the second and third predetermined periods of time are each about thirty seconds.

31. A method comprising:
at a control circuit of a communication device:
initiating a relationship-establishment mode of operation of the communication device to establish a relationship with a second communication device;
during the relationship-establishment mode of operation, operating in both a learn-mode of operation and a pairing-mode of operation; and
wherein, when during the relationship-establishment mode of operation the control circuit completes the learn-mode of operation for a given platform, the relationship-establishment mode of operation switches to only operating using the pairing-mode of operation during a remainder of the relationship-establishment mode of operation.

32. The method of claim 31 wherein only operating using the pairing-mode of operation during a remainder of the relationship-establishment mode of operation comprises only monitoring for pairing-mode transmissions unless and until a pairing-mode transmission is received.

33. The method of claim 31 wherein only operating using the pairing-mode of operation during a remainder of the relationship-establishment mode of operation comprises both transmitting pairing-mode transmissions and monitoring for pairing-mode transmissions regardless of whether a pairing-mode transmission is received.

34. The method of claim 31 further comprising:
determining information regarding the given platform;
and wherein switching to only operating using the pairing-mode of operation further comprises only switching to only operating using the pairing-mode of operation as a function of the information regarding the given platform.

35. A method comprising:
at a control circuit of a communication device:
initiating a relationship-establishment mode of operation of the communication device to establish a relationship with a second communication device;
during the relationship-establishment mode of operation, operating in both a learn-mode of operation and a pairing-mode of operation; and
wherein, when during the relationship-establishment mode of operation the control circuit completes the pairing-mode of operation for a given platform, the relationship-establishment mode of operation switches to only operating using the learn-mode of operation during a remainder of the relationship-establishment mode of operation.

36. The method of claim 35 wherein only operating using the learn-mode of operation during the remainder of the relationship-establishment mode of operation comprises only monitoring for learn-mode transmissions.

37. The method of claim 35 further comprising:
determining information regarding the given platform;
and wherein switching to only operating using the learn-mode of operation further comprises only switching to only operating using the learn-mode of operation as a function of the information regarding the given platform.

38. An apparatus comprising:
a transceiver;
memory;
a control circuit operably coupled to the transceiver and the memory and configured to:
initiate a relationship-establishment mode of operation;
during the relationship-establishment mode of operation, use the transceiver to operate in both a learn-mode of operation and a pairing-mode of operation;
wherein the control circuit is configured to operate in both the learn-mode of operation and the pairing-mode of operation by, during a first predetermined period of time, monitoring for both learn-mode transmissions and pairing-mode transmissions.

39. The apparatus of claim 38 wherein the control circuit is configured to monitor for both the learn-mode transmissions and the pairing-mode transmissions by monitoring for both the learn-mode transmissions and the pairing-mode transmissions in a temporally-interleaved manner.

40. The apparatus of claim 39 wherein the control circuit is configured to monitor for both the learn-mode transmissions and the pairing-mode transmissions in the temporally-interleaved manner by:
monitoring for the learn-mode transmissions in a first reception band;
monitoring for the pairing-mode transmissions in a second reception band that is at least partially different from the first reception band.

41. The apparatus of claim 38 wherein, during the first predetermined period of time, the control circuit is configured to monitor for both the learn-mode transmissions and the pairing-mode transmissions by not transmitting via the control circuit unless and until a pairing-mode transmission is received.

42. The apparatus of claim 41 wherein the control circuit is configured to, upon receiving, during the first predetermined period of time, a learn-mode transmission containing relationship-establishment content from a first transmitting platform, use the relationship-establishment content to learn the first transmitting platform and thereby facilitate recognizing and acting upon subsequent transmissions from the first transmitting platform.

43. The apparatus of claim 42 wherein the learn-mode transmission and at least some of the subsequent transmissions use an identical message-field syntax.

44. The apparatus of claim 42 wherein the control circuit is configured to, upon using the relationship-establishment content to learn the first transmitting platform, automatically conclude the relationship-establishment mode of operation notwithstanding that the first predetermined period of time may not have yet expired.

45. The apparatus of claim 44 wherein the control circuit is configured to, upon receiving, during the first predetermined period of time, a pairing-mode transmission from a second transmitting platform:
 transceive relationship-establishment content to thereby pair with the second transmitting platform;
 automatically conclude the relationship-establishment mode of operation notwithstanding that the first predetermined period of time may not have yet expired.

46. The apparatus of claim 38 wherein the control circuit is configured to, as part of operating in both the learn-mode of operation and the pairing-mode of operation, and subsequent to the first predetermined period of time and for a second predetermined period of time, continue to monitor for the learn-mode transmissions while now transmitting pairing-mode content.

47. The apparatus of claim 46 wherein the control circuit is configured to transmit the pairing-mode content without monitoring for the pairing-mode transmissions unless and until the control circuit receives a transmitted pairing-mode response to the transmitting of the pairing-mode content.

48. The apparatus of claim 47 wherein the control circuit is configured to, upon receiving, during the second predetermined period of time, the pairing-mode response:
 complete pairing based upon the pairing-mode response;
 automatically conclude the relationship-establishment mode of operation notwithstanding that the second predetermined period of time may not have yet expired.

49. The apparatus of claim 48 wherein the control circuit is configured to, upon receiving, during the second predetermined period of time, a learn-mode transmission containing relationship-establishment content from a transmitting platform:
 use the relationship-establishment content to learn the transmitting platform and thereby facilitate recognizing and acting upon subsequent transmissions from the transmitting platform;
 automatically conclude the relationship-establishment mode of operation notwithstanding that the second predetermined period of time may not have yet expired.

50. The apparatus of claim 46 wherein the control circuit is configured to, as part of operating in both the learn-mode of operation and the pairing-mode of operation, and subsequent to the second predetermined period of time and for a third predetermined period of time, only monitor for pairing-mode transmissions unless and until a pairing-mode transmission is received.

51. The apparatus of claim 50 wherein the control circuit is configured to, upon receiving, during the third predetermined period of time, a pairing-mode transmission from a transmitting platform:
 transceive relationship-establishment content to thereby pair with the transmitting platform;
 automatically conclude the relationship-establishment mode of operation notwithstanding that the third predetermined period of time may not have yet expired.

52. The apparatus of claim 50 wherein the control circuit is configured to automatically conclude the relationship-establishment mode of operation upon expiration of the third predetermined period of time.

53. A method comprising:
 at a control circuit:
  detecting an end-user assertion of an end-user interface;
  in response to detecting the end-user assertion, disabling a previously-established, learned relationship with each of a first category of remote platforms, the previously-established, learned relationship established with the control circuit operating in a learn mode of operation;
  detecting a second end-user assertion of the end-user interface;
  in response to detecting the second end-user assertion, disabling a previously-established, paired relationship with each of a second category of remote platforms, the previously-established, paired relationship established with the control circuit operating in a pairing mode of operation.

54. The method of claim 53 wherein the end-user interface comprises a push button.

55. The method of claim 53 wherein detecting the end-user assertion of the end-user interface comprises detecting that the end user has asserted the end-user interface for a particular duration of time.

56. The method of claim 55 wherein the particular duration of time comprises at least two seconds.

57. The method of claim 56 wherein the particular duration of time comprises about six seconds.

58. The method of claim 55 wherein detecting the second end-user assertion of the end-user interface comprises detecting that the end user has asserted the end-user interface a second time following the particular duration of time for a second particular duration of time.

59. The method of claim 58 wherein the particular duration of time and the second particular duration of time are both about a same duration of time.

60. The method of claim 59 wherein the same duration of time is about six seconds.

61. The method of claim 55 wherein detecting the second end-user assertion of the end-user interface comprises detecting that the end user has continued to assert the end-user interface following the particular duration of time for a second particular duration of time.

62. The method of claim 53 wherein disabling a previously-established authorized relationship with each of a first category of remote platforms comprises disabling authorized learned relationships.

63. The method of claim 62 wherein disabling a previously-established relationship with each of a second category of remote platforms comprises disabling authorized paired relationships.

64. The method of claim 53 wherein disabling comprises, at least in part, erasing from memory.

65. The method of claim 53 wherein detecting a second end-user assertion of the end-user interface comprises detecting as a second end-user assertion of the end-user interface only a subsequent end-user assertion of the end-user interface that occurs within a predetermined period of time of detecting the end-user assertion of the end-user interface.

66. The method of claim 53 wherein detecting a second end-user assertion of the end-user interface comprises detecting that the end-user interface has been asserted by an end user when there is no extant previously-established authorized relationship with the first category of remote platform.

67. An apparatus comprising:
an end-user interface;
a memory;
a control circuit operably coupled to the end-user interface and the memory, and configured to:
detect a first end-user assertion of the end-user interface;
in response to detecting the first end-user assertion, disable a previously-established, learned relationship with each of a first category of remote platforms, the previously-established, learned relationship established with the control circuit operating in a learn mode of operation;
detect a second end-user assertion of the end-user interface;
in response to detecting the second end-user assertion, disable a previously-established, paired relationship with each of a second category of remote platforms, the previously-established, paired relationship established with the control circuit operating in a pairing mode of operation.

68. The apparatus of claim 67 wherein the end-user interface comprises a push button.

69. The apparatus of claim 67 wherein the control circuit is configured to detect the first end-user assertion of the end-user interface by detecting that the end user has asserted the end-user interface for a particular duration of time.

70. The apparatus of claim 69 wherein the particular duration of time comprises about six seconds.

71. The apparatus of claim 69 wherein the control circuit is configured to detect the second end-user assertion of the end-user interface by detecting that the end user has asserted the end-user interface a second time following the particular duration of time for a second particular duration of time.

72. The apparatus of claim 71 wherein the particular duration of time and the second particular duration of time are both about a same duration of time.

73. The apparatus of claim 69 wherein the control circuit is configured to detect the second end-user assertion of the end-user interface by detecting that the end user has continued to assert the end-user interface following the particular duration of time for a second particular duration of time.

74. The apparatus of claim 67 wherein the control circuit is configured to disable a previously-established authorized relationship with each of a first category of remote platforms by disabling authorized learned relationships.

75. The apparatus of claim 74 wherein the control circuit is configured to disable a previously-established relationship with each of a second category of remote platforms by disabling authorized paired relationships.

76. The apparatus of claim 67 wherein the control circuit is configured to disable by, at least in part, erasing information from the memory.

77. The apparatus of claim 67 wherein the control circuit is configured to detect a second end-user assertion of the end-user interface by detecting as a second end-user assertion of the end-user interface only a subsequent end-user assertion of the end-user interface that occurs within a predetermined period of time of detecting the end-user assertion of the end-user interface.

78. The apparatus of claim 67 wherein the control circuit is configured to detect a second end-user assertion of the end-user interface by detecting that the end-user interface has been asserted by an end user when there is no extant previously-established authorized relationship with the first category of remote platform.

* * * * *